(12) United States Patent
Sawahata

(10) Patent No.: US 7,761,206 B2
(45) Date of Patent: Jul. 20, 2010

(54) PASSENGER PROTECTION APPARATUS

(75) Inventor: Toshikatsu Sawahata, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 1156 days.

(21) Appl. No.: 11/384,438

(22) Filed: Mar. 21, 2006

(65) Prior Publication Data
US 2006/0161323 A1 Jul. 20, 2006

(30) Foreign Application Priority Data

Oct. 7, 2004 (JP) ............................. 2004-294563
Mar. 22, 2005 (JP) ............................. 2005-081351

(51) Int. Cl.
*B60R 21/0132* (2006.01)
*B60R 21/13* (2006.01)
(52) U.S. Cl. ............................. 701/45; 701/34; 280/735
(58) Field of Classification Search .................... 701/45
See application file for complete search history.

(56) References Cited

U.S. PATENT DOCUMENTS

| | | | | |
|---|---|---|---|---|
| 6,141,604 | A * | 10/2000 | Mattes et al. | 701/1 |
| 6,631,317 | B2 * | 10/2003 | Lu et al. | 701/45 |
| 6,640,173 | B1 * | 10/2003 | Zheng | 701/41 |
| 7,057,503 | B2 * | 6/2006 | Watson | 340/440 |
| 2003/0023359 | A1 * | 1/2003 | Kueblbeck et al. | 701/45 |
| 2003/0065430 | A1 * | 4/2003 | Lu et al. | 701/45 |
| 2003/0093201 | A1 * | 5/2003 | Schubert et al. | 701/46 |
| 2003/0182041 | A1 * | 9/2003 | Watson | 701/45 |
| 2004/0030474 | A1 * | 2/2004 | Samuel et al. | 701/36 |

FOREIGN PATENT DOCUMENTS

| | | |
|---|---|---|
| DE | 100 25 260 A1 | 12/2001 |
| DE | 10025260 * | 12/2001 |
| EP | 1 312 515 A1 | 5/2003 |
| EP | 1312515 * | 5/2003 |
| JP | 2004-042846 A | 2/2004 |

OTHER PUBLICATIONS

Documents from European counterpart prosecution, 8 pages.

* cited by examiner

*Primary Examiner*—Thomas G Black
*Assistant Examiner*—Shelley Chen
(74) *Attorney, Agent, or Firm*—Foley & Lardner LLP

(57) ABSTRACT

A passenger protection apparatus (1) includes a rollover angular speed detection device (10), which detects a rollover angular speed during vehicle rollover, a rollover determination device (14), which conducts a determination of the vehicle rollover based on the rollover angular speed detected by the rollover angular speed detection device (10) and a rollover angle obtained from the rollover angular speed, a passenger protector (2), which operates in accordance with a determination result of the rollover determination device (14) to protect a passenger, a vertical G sensor (11), which detects an acceleration of an up and down direction of the vehicle; a horizontal G sensor (12), which detects an acceleration of a right and left direction of the vehicle, and an angular speed sensor error determination device (16), which conducts a determination whether or not a zero-point drift of the rollover angular speed detection device (10) occurs based on a detected signal of the vertical G sensor (11) or the horizontal G sensor (12).

5 Claims, 4 Drawing Sheets

PASSENGER PROTECTION APPARATUS

BACKGROUND

1. Field of the Invention

The present invention relates to a passenger protection apparatus, which activates a passenger protector to protect a passenger from an impact during vehicle rollover.

2. Description of Related Art

Conventionally, there has been known a passenger protection apparatus, which determines vehicle rollover by a determination whether or not a rollover angular speed produced during vehicle rollover and a rollover angle obtained from the rollover angular speed meet previously defined threshold conditions, respectively, and activates a passenger protector such as a curtain airbag, seatbelt pretensioner, active rollover, etc., if the vehicle rollover is determined (reference to JP-A-2004-42846).

By the way, in the above passenger protection apparatus, a rollover angular speed of a vehicle is detected by an angular speed sensor provided in the vehicle, and the rollover angular speed detected by the angular speed sensor is integrated so as to obtain a rollover angle of the vehicle.

However, if an error (zero-point drift) was observed in an initial setting value during setting the initial value of the angular speed sensor, the rollover angular speed of the vehicle is constantly detected, and the rollover angular speed is always integrated. Thereby, the rollover angle was accumulated.

In this case, it could not determine whether the rollover angular speed of the vehicle to be constantly detected was detected by the error observed during setting the initial setting value of the angular speed sensor or was detected by the vehicle rollover.

Therefore, the accumulated rollover angle met the threshold condition, and the occurrence of the vehicle rollover was determined regardless of the error during setting the initial setting value of the angular speed sensor, resulting in the miss-operation of the passenger protector.

SUMMARY

It is, therefore, an object of the present invention to provide a passenger protection apparatus capable of improving determination accuracy whether or not vehicle rollover occurs and preventing a miss-operation of a passenger protector.

In order to solve the above problems, a passenger protection apparatus according to a first aspect of the present invention comprises a rollover angular speed detection device, which detects a rollover angular speed during vehicle rollover; a rollover determination device, which conducts a determination of the vehicle rollover based on the rollover angular speed detected by the rollover angular speed detection device and a rollover angle obtained from the rollover angular speed; a passenger protector, which operates in accordance with a determination result of the rollover determination device to protect a passenger; a vertical G sensor, which detects an acceleration of an up and down direction of the vehicle; a horizontal G sensor, which detects an acceleration of a right and left direction of the vehicle; and an angular speed sensor error determination device, which conducts a determination whether or not a zero-point drift of the rollover angular speed detection device occurs based on a detected signal of the vertical G sensor or the horizontal G sensor.

According to the first aspect of the present invention, even if the rollover angular speed detection device detects the rollover angular speed of the vehicle, it can be determined that the vehicle rollover does not occur from the detected signal of the vertical G sensor or the horizontal G sensor.

Therefore, it can be determined whether or not the zero-point drift of the rollover angular speed detection device is observed in a state that the vehicle rollover does not occur, and it can be absolutely detected whether or not the zero-point drift of the rollover angular speed detection device is observed. Accordingly, the determination accuracy whether or not vehicle rollover occurs can be improved.

In addition, if it is detected that the zero-point drift of the rollover angular speed detection device is observed, the miss-operation of the passenger protector can be absolutely prevented by prohibiting the operation of the passenger protector.

A passenger protection apparatus according to a second aspect of the present invention comprises a rollover angular speed detection device, which detects a rollover angular speed during vehicle rollover; a rollover determination device, which conducts a determination of the vehicle rollover based on the rollover angular speed detected by the rollover angular speed detection device and a rollover angle obtained from the rollover angular speed; a passenger protector, which operates in accordance with a determination result of the rollover determination device to protect a passenger; a vertical G sensor, which detects an acceleration of an up and down direction of the vehicle; a horizontal G sensor, which detects an acceleration of a right and left direction of the vehicle; and an angular speed sensor error determination device, which conducts a determination whether or not a zero-point drift of the rollover angular speed detection device occurs based on detected signals of the vertical G sensor and the horizontal G sensor.

According to the second aspect of the present invention, even if the rollover angular speed detection device detects the rollover angular speed of the vehicle, it can be determined that the vehicle rollover does not occur from both of the detected signals of the vertical G sensor and the horizontal G sensor. Therefore, the determination accuracy can be further improved when determining whether or not the vehicle rollover occurs.

A passenger protection apparatus according to a third aspect of the present invention comprises a rollover angular speed detection device, which detects a rollover angular speed during vehicle rollover; a rollover determination device, which conducts a determination of the vehicle rollover based on the rollover angular speed detected by the rollover angular speed detection device and a rollover angle obtained from the rollover angular speed; a passenger protector, which operates in accordance with a determination result of the rollover determination device to protect a passenger; a vertical G sensor, which detects an acceleration of an up and down direction of the vehicle; a horizontal G sensor, which detects an acceleration of a right and left direction of the vehicle; and a G sensor error determination device, which conducts a determination whether or not a zero-point drift of the vertical G sensor or the horizontal G sensor occurs based on a detected signal of the rollover angular speed detection device.

According to the third aspect of the present invention, the zero-point drift of the vertical G sensor or the horizontal G sensor can be certainly detected. Therefore, even if the determination of the vehicle rollover is conducted by using the vertical G sensor and the horizontal G sensor, the determination accuracy whether or not the vehicle rollover occurs can be improved and the miss-operation of the passenger protector can be prevented.

A passenger protection apparatus according to a fourth aspect of the present invention comprises a rollover angular speed detection device, which detects a rollover angular speed during vehicle rollover; a rollover determination device, which conducts a determination of the vehicle rollover based on the rollover angular speed detected by the rollover angular speed detection device and a rollover angle obtained from the rollover angular speed; a passenger protector, which operates in accordance with a determination result of the rollover determination device to protect a passenger; a vertical G sensor, which detects an acceleration of an up and down direction of the vehicle; a horizontal G sensor, which detects an acceleration of a right and left direction of the vehicle; and a drift-correction device, which calculates a zero-point drift value of the rollover angular speed detection device based on a detected signal of the vertical G sensor or the horizontal G sensor and a detected signal of the rollover angular speed detection device, and corrects the detected signal of the rollover angular speed detection device by using the zero-point drift value.

According to the fourth aspect of the present invention, even if the zero-point drift of the rollover angular speed detection device is observed, the detected rollover angular speed can be corrected, and the corrected rollover angular speed can be used for the determination whether or not the vehicle rollover occurs.

Therefore, the determination accuracy whether or not the vehicle rollover occurs can be improved, and the miss-operation of the passenger protector can be prevented.

A passenger protection apparatus according to a fifth aspect of the present invention comprises a rollover angular speed detection device, which detects a rollover angular speed during vehicle rollover; a rollover determination device, which conducts a determination of the vehicle rollover based on the rollover angular speed detected by the rollover angular speed detection device and a rollover angle obtained from the rollover angular speed; a passenger protector, which operates in accordance with a determination result of the rollover determination device to protect a passenger; a vertical G sensor, which detects an acceleration of an up and down direction of the vehicle; a horizontal G sensor, which detects an acceleration of a right and left direction of the vehicle; and a drift-correction device, which calculates a zero-point drift value of the rollover angular speed detection device based on detected signals of the vertical G sensor and the horizontal G sensor and a detected signal of the rollover angular speed detection device, and corrects the detected signal of the rollover angular speed detection device by using the zero-point drift value.

According to the fifth aspect of the present invention, even if the zero-point drift of the rollover angular speed detection device is observed, the detected rollover angular speed can be corrected, and the corrected rollover angular speed can be used for the determination whether or not the corrected rollover angular speed occurs.

Therefore, the determination accuracy whether or not the vehicle rollover occurs can be improved, and the miss-operation of the passenger protector can be prevented.

Furthermore, since the zero-point drift value of the rollover angular speed detection device is calculated based on the detected signals of the vertical G sensor and the horizontal G sensor and the detected signal of the rollover angular speed detection device, the calculation accuracy of the zero-point drift value can be improved.

According to the present invention, it is possible to provide the passenger protection apparatus capable of improving the determination accuracy whether or not the vehicle rollover occurs, and preventing the miss-operation of the passenger protector.

PRIORITY CLAIM

The present application is based on, and claim priority from, Japanese Patent Application No. 2005-081351, filed on Mar. 22, 2005, the disclosure of which is hereby incorporated by reference herein in its entirety.

DETAILED DESCRIPTION OF THE PREFERRED EMBODIMENTS

Hereinafter embodiments of a passenger protection apparatus according to the present invention will be described with reference to the accompanying drawings.

First Embodiment

Figure 1:
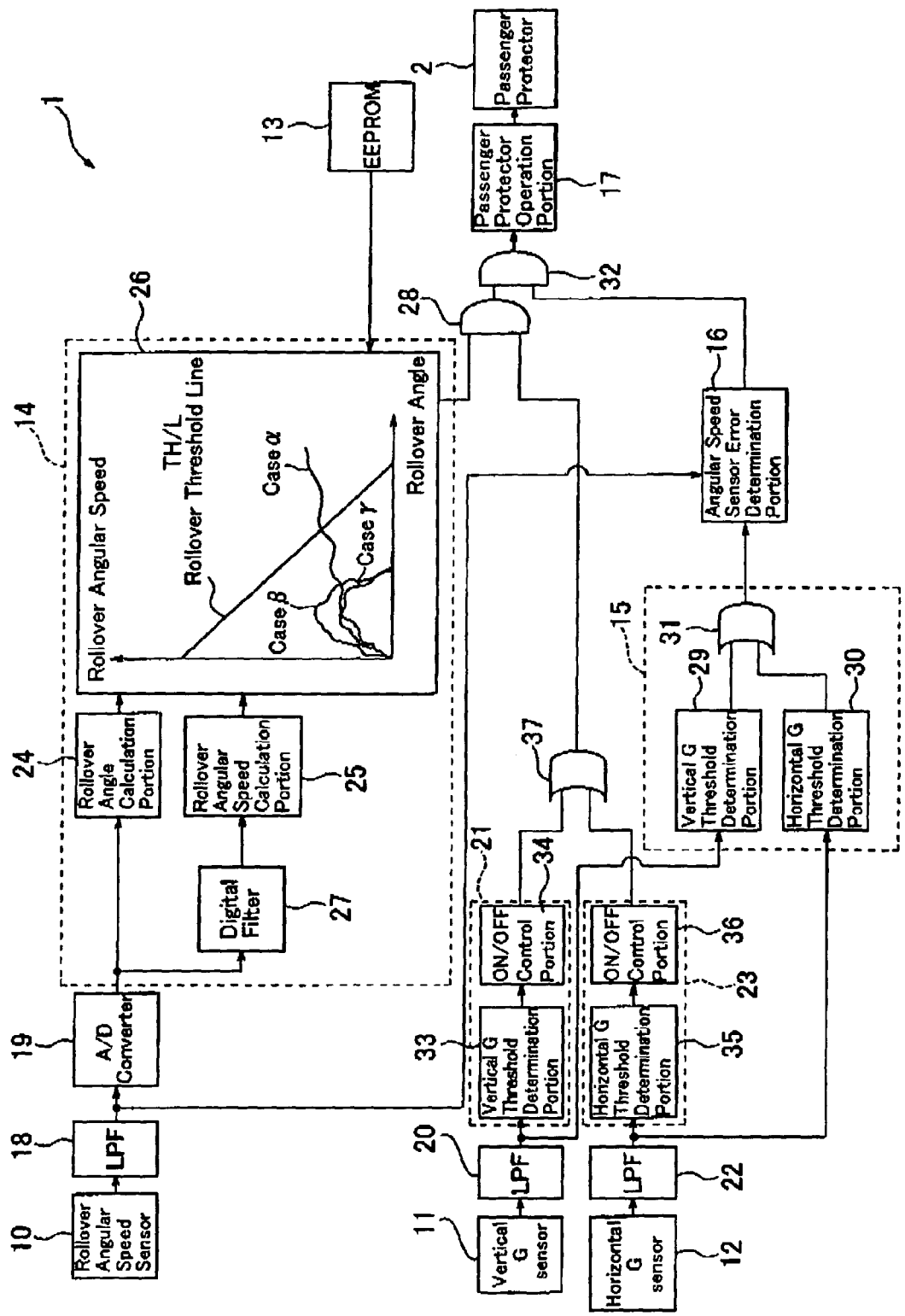
FIG. 1 is a block diagram illustrating an entire passenger protection apparatus of a first embodiment of the present invention.

FIG. 1 illustrates an entire structure of a first embodiment of a passenger protection apparatus according to the present invention.

A passenger protection apparatus 1 comprises a passenger protector 2 such as a curtain airbag, seatbelt pretensioner, and active roll bar. The passenger protection apparatus 1 determines whether or not a vehicle rolls over, and protects a passenger from an impact to be occurred during vehicle rollover by appropriately activating the vehicle protector 2 if it is determined the vehicle rolls over.

As shown in FIG. 1, the vehicle protection apparatus 1 comprises a rollover angular speed sensor (rollover angular speed detection device) 10, a vertical G sensor 11, a horizontal G sensor 12, an EEPROM 13, a rollover determination module 14, a vehicle impact roll determination module (rollover determination device) 15, an angular speed sensor error determination portion (angular speed sensor error determination device) 16, a passenger protector operation portion (protector control device) 17 and the like.

The rollover angular speed sensor 10 detects an angular speed (rollover angular speed) of vehicle rollover (rotation) centering on an axis line (X axis), which runs through a weighted center of vehicle, and extends in the backward and forward direction of the vehicle. An angular speed signal of an output signal from the rollover angular speed sensor 10 is filtered by a high frequency noise elimination filter (LPF: Low Pass Filter) 18, and then input to an angular speed sensor error determination portion 16 and also to the rollover determination module 14 after converted by an A/D converter 19.

The vertical G sensor 11 detects acceleration (vertical G) of the up and down direction of the vehicle. A vertical G signal of an output signal from the vertical G sensor 11 is filtered by a high frequency noise elimination filter (LPF: Low Pass Filter) 20, and then is input to the vehicle impact roll determination module 15 and the after-motioned vertical G determination module 21.

The horizontal G sensor 12 detects acceleration (horizontal G) of the right and left direction of the vehicle (width direction). A horizontal G signal of an output signal from this horizontal G sensor 12 is filtered by a high frequency noise elimination filter (LPF: Low Pass Filter) 22, and then is input to the vehicle impact roll determination module 15 and the after-mentioned horizontal G determination module 23.

The EEPROM 13 previously stores parameters of a vehicle structure such as a weighted center position of vehicle, a weighted center height of vehicle, a distance from a contact patch of wheel to a weighted center position, a tread width, a vehicle weight, and acceleration gravity (9.8 m sec$^2$). The vehicle structure parameters stored in the EEPROM 13 are input to the rollover determination module 14.

The rollover determination module 14 determines whether a vehicle rolls over or not based on an angular speed signal. The rollover determination module 14 comprises a rollover angle calculation portion 24, a rollover angular speed calculation portion 25 and a vehicle rollover determination portion 26.

The rollover angle calculation portion 24 obtains a rollover angle of a vehicle by integrating an angular speed signal to be obtained from the rollover angular speed sensor 10. An angle signal of an output signal from the rollover angle calculation portion 24 is input to the vehicle rollover determination portion 26.

The rollover angular speed calculation portion 25 obtains a rollover angular speed of a vehicle by adding a previously set initial setting value to an angular speed signal input through a digital filter 27, which eliminates noise. An angular speed signal for determination of an output signal from the rollover angular speed calculation portion 25 is input to the vehicle rollover determination portion 26.

The vehicle rollover determination portion 26 determines whether or not there is a possibility of vehicle rollover. A rollover determination signal of an output signal from the vehicle rollover determination portion 26 is input to the after-mentioned AND circuit 28.

The vehicle rollover determination portion 26 previously sets a rollover threshold line TH/L based on the angle signal to be obtained from the rollover angle calculation portion 24, the angular speed signal for determination to be obtained from the rollover angular speed calculation portion 25, and the vehicle structure parameters stored in the EEPROM 13.

In addition, a setting method of the rollover threshold line TH/L is well known whereby the explanation will be omitted.

The vehicle rollover determination portion 26 compares the rollover threshold line TH/L and an actual rollover angular speed of the vehicle to determine whether or not there is a possibility of vehicle rollover. In this case, it is determined that there is a possibility of the vehicle rollover if the actual rollover angular speed of the vehicle exceeds the rollover threshold line TH/L (Case α), and it is determined that there is no possibility of the vehicle rollover if the actual rollover angular speed does not exceed the rollover threshold line TH/L (Case β, Case γ).

The vehicle impact roll determination module 15 determines whether or not an impact and a roll phenomenon (vehicle rollover) to a vehicle occur from the vertical G signal or horizontal G signal. The vehicle impact roll determination module 15 comprises a vertical G threshold determination portion 29, a horizontal G threshold determination portion 30 and an OR circuit 31.

The vertical G threshold determination portion 29 determines whether or not the vertical G signal to be obtained form the vertical G sensor 11 is within a range of a previously set predetermined threshold. In this case, this vertical G threshold determination portion 29 outputs an ON signal if the vertical G signal is within the range of the predetermined threshold, and outputs an OFF signal if the vertical G signal is beyond the range of the predetermined threshold.

The horizontal G threshold determination portion 30 determines whether or not the horizontal G signal to be obtained from the horizontal G sensor 12 is within a range of a previously set predetermined threshold. In this case, the horizontal G threshold determination portion 30 outputs an ON signal if the horizontal G signal is within the range of the predetermined threshold, and outputs an OFF signal if the horizontal G signal is beyond the range of the predetermined threshold.

The OR circuit 31 determines whether or not an OR signal is input from at least one of the vertical G threshold determination portion 29 and the horizontal G threshold determination portion 30 (whether or not an OR condition of the vertical G threshold determination portion 29 and the horizontal G threshold determination portion 30 is achieved).

This OR circuit 31 outputs a first rollover status signal indicating vehicle rollover and an impact to a vehicle do not occur if the OR condition is achieved, and outputs a first rollover status signal indicating vehicle rollover and an impact to a vehicle occur, if the OR condition is not achieved. Then, the first rollover status signal is input to the angular speed sensor error determination portion 16.

The angular speed sensor error determination portion 16 determines whether or not the zero-point drift of the rollover angular speed sensor 10 occurs based on the angular speed signal input from the rollover angular speed sensor 10 and the first rollover status signal input from the vehicle impact roll determination module 15.

An error status signal of an output signal from the angular speed sensor error determination portion 16 is input to the passenger protector operation portion 17 through the after-mentioned AND circuit 32.

The vertical G determination module 21 determines whether or not the vertical G signal to be obtained from the vertical G sensor 11 is within a range of a previously set predetermined threshold. The vertical G determination module 21 comprises a vertical G threshold determination portion 33 and an ON/OFF control portion 34.

The vertical G threshold determination portion 33 compares the vertical G signal to be obtained from the vertical G sensor 11 and the previously set predetermined threshold. If the vertical G signal exceeds the range of the predetermined threshold value, the ON/OFF control portion 34 outputs an ON signal.

The horizontal G determination module 23 determines whether or not the horizontal G signal to be obtained from the horizontal G sensor 12 is within a range of a previously set predetermined threshold. The horizontal G determination module 23 comprises a horizontal G threshold determination portion 35 and an ON/OFF control portion 36.

The horizontal G threshold determination portion 35 compares the horizontal G signal to be obtained from the horizontal G sensor 12 and the previously set predetermined threshold. The ON/OFF control portion 36 outputs an ON signal if the horizontal G signal exceeds the range of the predetermined threshold.

The ON signals output from the ON/OFF control portions 34, 36 are input to the OR circuit 37.

The OR circuit 37 determines whether or not the ON signal is input from at least one of the ON/OFF control portion 34 and the ON/OFF control portion 36 (whether or not the OR condition of the ON/OFF control portion 34 and the ON/OFF control portion 36 is achieved).

The OR circuit 37 outputs a second rollover status signal indicating that vehicle rollover and an impact to a vehicle occur, if the OR condition is achieved, and outputs a second rollover status signal indicating that vehicle rollover and an impact to a vehicle do not occur, if the OR condition is not achieved. The second rollover status signal is input to the AND circuit 28.

A rollover determination signal indicating the possibility of vehicle rollover is input to the AND circuit 28 from the vehicle roll over determination portion 26. The AND circuit 28 determines whether or not the second rollover status signal indicating vehicle rollover and impact is input from the OR circuit 37 (whether or not the AND condition of the vehicle rollover determination portion 26 and the OR circuit 37 is achieved).

The AND circuit 28 outputs a third rollover status signal indicating that vehicle rollover and an impact to a vehicle occur, if the AND condition is achieved, and outputs a third rollover status signal indicating that vehicle rollover and an impact to a vehicle do not occur, if the AND condition is not achieved. Then, the third rollover status signal is input to the AND circuit 32.

The third rollover status signal indicating vehicle rollover and impact is input to the AND circuit 32 from the AND circuit 28. The AND circuit 32 determines whether or not an error status signal indicating the zero-point drift of the rollover angular speed sensor 10 is input from the angular speed sensor error determination portion 16 (whether or not the AND condition of the AND circuit 28 and the angular speed sensor error determination portion 16 is achieved).

The AND circuit 32 outputs a non-operation signal to the passenger detector operation portion 17 if the AND condition is achieved, and outputs an operation signal to the passenger protector operation portion 17 if the AND condition is not achieved.

If the third rollover status signal indicating that vehicle rollover and impact do not occur is input to the AND circuit 32 from the AND circuit 28, the AND circuit 32 outputs the non-operation signal to the passenger protector operation portion 17 regardless of whether or not the error status signal indicating the zero-point drift of the rollover angular speed sensor 10 is input.

The passenger detector operation portion 17 appropriately activates a passenger protector, which is disposed in an appropriate position, in the passenger protectors 2 disposed in the vehicle, if the operation signal is input from the AND circuit 32

Next, a function of the passenger protection apparatus 1 according to the present invention will be described.

In the passenger protection apparatus 1, in order to determine whether or not the zero-point drift of the rollover angular speed sensor 10 is observed, at first, the rollover angular speed sensor 10 detects an angular speed of vehicle rollover, the vertical G sensor 11 detects an acceleration (vertical G) of the up and down direction of the vehicle, and the horizontal G sensor 12 detects an acceleration (horizontal G) of the right and left direction of the vehicle.

In this case, the vertical G signal detected by the vertical G sensor 11 and the horizontal G signal detected by the horizontal G sensor 12 are input to the vehicle impact roll determination module 15.

This vehicle impact roll determination module 15 determines whether or not the vehicle rollover occurs based on the input vertical G signal and the horizontal G signal.

In this case, if at least one of the vertical G signal and the horizontal G signal is within a previously set predetermined threshold, the vehicle impact roll determination module 15 determines that the vehicle rollover and the impact to the vehicle do not occur, and outputs the first rollover status signal indicating that vehicle rollover and impact do not occur.

On the other hand, if both of the vertical G signal and the horizontal G signal are beyond the previously set predetermined threshold, the vehicle impact roll determination module 15 determines that the vehicle rollover and the impact to the vehicle occur, and outputs the first rollover status signal indicating vehicle rollover and impact.

If the first rollover status signal indicating that vehicle rollover and impact do not occur is input to the angular speed sensor error determination portion 16 from the vehicle impact roll determination module 15, the angular speed sensor error determination portion 16 determines whether or not the zero-point drift of the rollover angular speed sensor 10 is observed.

In order to determines whether or not the zero-point drift of the rollover angular speed sensor 10 is observed by the angular speed sensor error determination portion 16, the angular speed sensor error determination portion 16 compares the previously set error determination threshold and the angular speed signal input from the rollover angular speed sensor 10.

The angular speed sensor error determination portion 16 determines that the zero-point drift of the rollover angular speed sensor 10 is observed, if the angular speed signal input from the rollover angular speed sensor 10 is larger than the previously set error determination threshold.

In addition, this angular speed sensor error determination portion 16 determines that the initial setting value of the rollover angular speed sensor 10 is normal, if the angular speed signal input from the rollover angular speed sensor 10 is smaller than the previously set error determination threshold.

If the first rollover status signal indicating that vehicle rollover and impact do not occur is input from the vehicle impact roll determination module 15, more particularly, if it is determined that the vehicle rollover does not occur, the angular speed sensor error determination portion 16 may sufficiently narrow an allowable range of error determination threshold. If the first rollover status signal indicating vehicle rollover and impact is input from the vehicle impact roll determination module 15, more particularly, if it is determined that the vehicle rollover occurs, the allowance range of the error determination threshold may sufficiently expand.

As stated above, it can be determined whether or not the zero-point drift of the rollover angular speed sensor 10 is observed in a state that the vehicle rollover and the impact to the vehicle do not occur. Therefore, the determination whether or not the error of the rollover angular speed sensor 10 is observed can be accurately detected.

Moreover, it is determined that the zero-point drift of the rollover angular speed sensor 10 is observed, the non-operation signal is output to the passenger protector operation portion 17 from the AND circuit 32, and the passenger protector operation portion 17 is controlled. Accordingly, the miss-operation can be prevented by stopping the operation of the passenger protector 2.

In addition, the zero-point drift of the rollover angular speed sensor 10 may be informed to a passenger as a system trouble of the passenger protection apparatus 1. The system trouble of the passenger protection apparatus 1 is thereby immediately identified, and the reliability can be improved.

As described above, the passenger protection apparatus 1 according to the present invention comprises the rollover angular speed sensor 10 of the rollover angular speed detection device, which detects a rollover angular speed during vehicle rollover, the rollover determination module 14 of the rollover determination device, which conducts the determination of the vehicle rollover based on the rollover angular speed detected by the rollover angular speed sensor 1 and the rollover angle obtained from the rollover angular speed, the passenger protector 2, which operates in accordance with the determination result of the rollover determination module 14 to protect a passenger, the vertical G sensor 11, which detects an acceleration of the up and down direction of the vehicle, the horizontal G sensor 12, which detects an acceleration of the right and left direction of the vehicle, and the angular speed sensor error determination portion 16 of the angular speed sensor error determination device, which conducts the determination whether or not the zero-point drift of the rollover angular speed sensor 10 is observed, based on the detected signal of the vertical G sensor 11 or the horizontal G sensor 12.

Accordingly, if the rollover angular speed sensor 10 detects a vehicle rollover angular speed, it can be determined that the vehicle rollover does not occur based on the detected signal of the vertical G sensor 11 or the horizontal G sensor.

Therefore, it can be determined whether or not the zero-point drift of the rollover angular speed sensor 10 occurs in a state that the vehicle rollover phenomenon does not occur, and the zero-point drift of the rollover angular speed sensor 10 can be absolutely detected. Accordingly, the determination accuracy whether or not the vehicle rollover occurs can be improved.

If it is detected that the zero-point drift of the rollover angular speed sensor 10 occurs, the miss-operation of the passenger protector 2 can be absolutely prevented by prohibiting the operation of the passenger protector 2.

In the above passenger protection apparatus 1, the vehicle impact roll determination module 15 comprises the OR circuit 31. It is determined that the vehicle rollover does not occur if the ON signal is input from the vertical G threshold determination portion 29 or the horizontal G threshold determination portion 30. However, the OR circuit 31 can be an AND circuit (not shown).

In this case, if the ON signal is input from both of the vertical G threshold determination portion 29 and the horizontal G threshold determination portion 30, more particularly, if the vertical G signal and the horizontal G signal are within the range of the predetermined threshold, it is determined the vehicle rollover does not occur.

Accordingly, the determination accuracy, which determines whether or not the vehicle rollover occurs, can be further improved.

Second Embodiment

Figure 2:
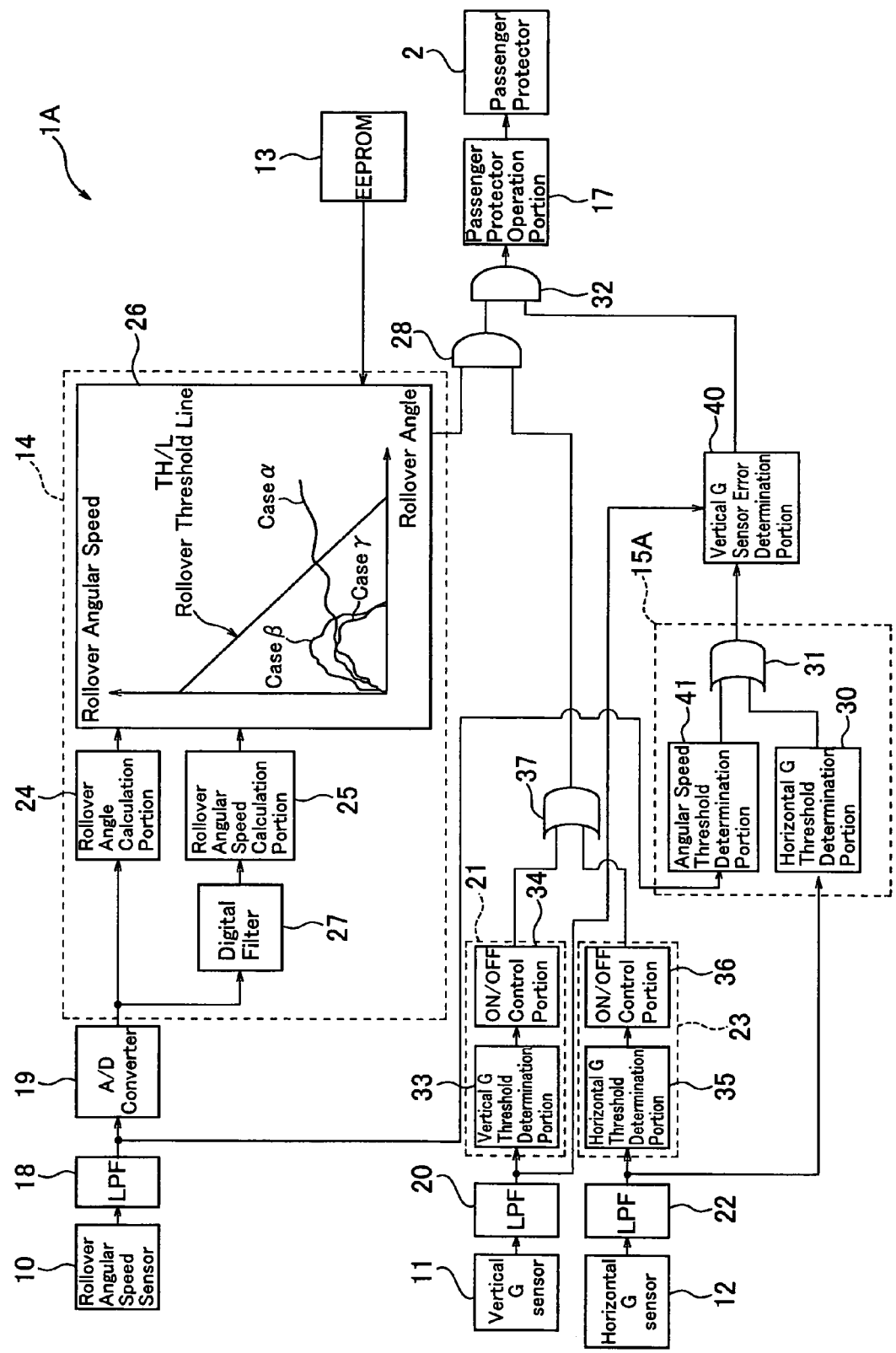
FIG. 2 is a block diagram illustrating an entire passenger protection apparatus of a second embodiment of the present invention.

FIG. 2 illustrates an entire structure of a second embodiment of a passenger protection apparatus according to the present invention.

In addition, the same reference numbers are used in the portions equivalent of the portions in the first embodiment; thus, the detailed explanations will be omitted.

A passenger protection apparatus 1A comprises the rollover angular speed sensor 10, the vertical G sensor 11, the horizontal G sensor 12, a vehicle impact roll determination module 15A, a vertical G sensor error determination portion (G sensor error detection device) 40 and the like, as shown in FIG. 2.

The vehicle impact roll determination module 15A is configured to determine whether or not vehicle rollover occurs from an angular speed signal or a horizontal G signal. The vehicle impact roll determination module 15A comprises an angular speed threshold determination portion 41, horizontal G threshold determination portion 30, and OR circuit 31.

The angular speed threshold determination portion 41 determines whether or not the angular speed signal to be obtained from the rollover angular speed sensor 10 is within a previously set predetermined threshold. This angular speed threshold determination portion 41 outputs an ON signal if the angular speed signal is within the predetermined threshold range.

If it is determined that the OR condition of the angular speed threshold determination portion 41 and the horizontal G threshold determination portion 30 is achieved by the OR circuit 31, the first rollover status signal indicating that vehicle rollover and impact do not occur is output from the vehicle impact roll determination module 15A.

Moreover, if the first rollover status signal indicating that vehicle rollover and impact do not occur is input from the vehicle impact roll determination module 15A, the vertical G sensor error determination portion 40 determines whether or not the zero-point drift of the vertical G sensor 11 occurs based on the vertical G signal input from the vertical G sensor 11.

In order to determine whether or not the zero-point drift of the vertical G sensor 11 occurs by this vertical G sensor error determination portion 40, this vertical G sensor error determination portion 40 compares the previously set error determination threshold and the vertical G signal input from the vertical G sensor 11.

The vertical G sensor error determination portion 40 determines that the zero-point drift of the vertical G sensor 11 occurs if the vertical G signal input from the vertical G sensor 11 is larger than the previously set error determination threshold.

In addition, the vertical G sensor error determination portion 40 determines that the initial setting value of the vertical G sensor 11 is normal if the angular speed signal input from the vertical G sensor 11 is smaller than the previously set error determination threshold.

As described above, since the passenger protection apparatus 1A comprises the vertical G sensor error determination portion 40, which determines whether or not the zero-point drift of the vertical sensor 11 occurs based on the angular speed signal of the detected signal of the rollover angular speed sensor 10 in a state that the vehicle rollover does not occur, the zero-point drift of the vertical G sensor 11 can be absolutely detected.

Accordingly, even if the vehicle rollover is determined by using the vertical G sensor 11, the vehicle rollover can be certainly determined. Therefore, the determination accuracy whether or not the vehicle rollover occurs can be improved, and also the miss-operation of the passenger protector 2 can be prevented.

In addition, the vertical G sensor error determination portion 40 absolutely accomplishes the error determination by sufficiently narrowing an allowance range of the error determination threshold, if the first rollover status signal indicating that vehicle rollover and impact do not occur is input from the vehicle impact roll determination module 15A, more particularly, if it is determined that the vehicle rollover do not occur. The vertical G sensor error determination portion 40 does not absolutely accomplish the error determination by sufficiently expanding the allowance range of the error determination threshold, if the first rollover status signal indicating vehicle rollover and impact is input from the vehicle impact roll determination module 15A, more particular, if it is determined that the vehicle rollover occurs.

Third Embodiment

Figure 3:
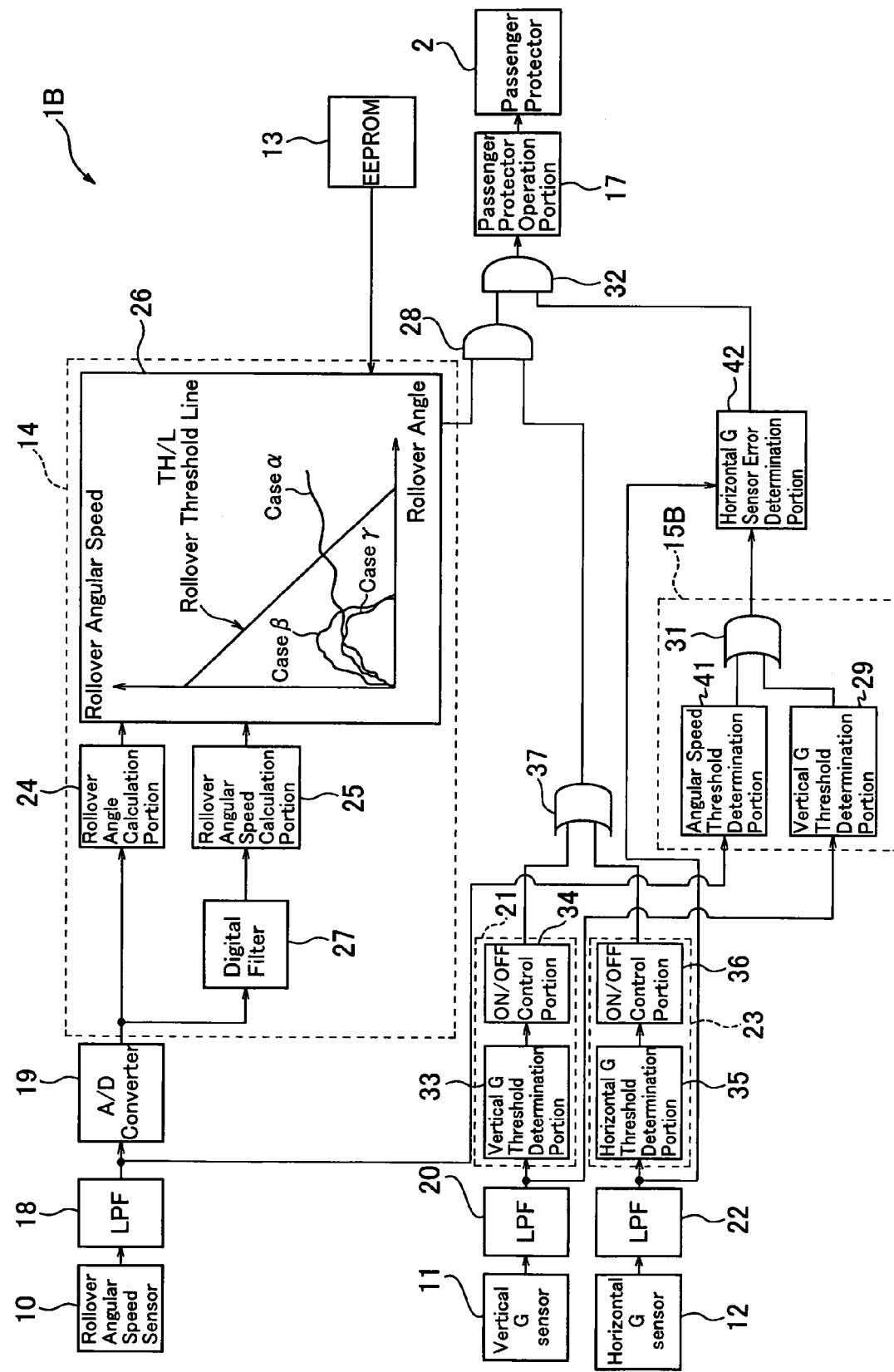
FIG. 3 is a block diagram illustrating an entire passenger protection apparatus of a third embodiment of the present invention.

FIG. 3 illustrates an entire structure of a third embodiment of a passenger protection apparatus according to the present invention.

In addition, the same reference numbers are used in the portions equivalent of the portions in the first embodiment and the second embodiment; thus, the detailed explanations will be omitted.

A passenger protection apparatus 1B comprises the rollover angular speed sensor 10, the vertical G sensor 11, the horizontal G sensor 12, a vehicle impact roll determination module 15B, the horizontal G sensor error determination portion (G sensor error determination device) 42 and the like, as shown in FIG. 3.

The vehicle impact roll determination module 15B determines whether or not vehicle rollover occurs from an angular speed signal or a vertical G signal. The vehicle impact roll determination module 15B comprises the angular speed threshold determination portion 41, vertical G threshold determination portion 29, and OR circuit 31.

If it is determined that the OR condition of the angular speed threshold determination portion 41 and the vertical G threshold determination portion 29 is achieved by the OR circuit 31, the first rollover status signal indicating that vehicle rollover and impact do not occur is output from the vehicle impact roll determination module 15B by the OR circuit 31.

In addition, if the first rollover status signal indicating that vehicle rollover and impact do not occur is input from the vehicle impact roll determination module 15B, the horizontal G sensor error determination portion 42 determines whether or not the zero-point drift of the horizontal G sensor 12 occurs based on the horizontal G signal input from the horizontal G sensor 12.

In order to determine whether or not the zero-point drift of the horizontal G sensor 12 occurs, the horizontal G sensor error determination portion 42 compares a previously set error determination threshold value and the horizontal G signal input from the horizontal G sensor 12.

The horizontal G sensor error determination portion 42 determines that the zero-point drift of the horizontal G sensor 12 occurs, if the horizontal G signal input from the horizontal G sensor 12 is larger than the previously set error determination threshold value.

The horizontal G sensor error determination portion 42 also determines that the initial setting value of the horizontal G sensor 12 is normal, if the angular speed signal input from the horizontal G sensor is smaller than the previously set error determination threshold.

As described above, since the passenger protection apparatus 1B comprises the horizontal G sensor error determination portion 42, which performs the determination whether or not the zero-point drift of the horizontal G sensor 12 occurs based on the angular speed signal of the detected signal of the rollover angular speed sensor 10 in a state that the vehicle rollover does not occur, the zero-point drift of the horizontal G sensor 12 can be certainly detected.

Accordingly, even if the vehicle rollover is determined by using the horizontal G sensor 12, the vehicle rollover can be absolutely determined. Therefore, the determination accuracy whether or not vehicle rollover occurs can be improved, and also the miss-operation of the passenger protector 2 can be prevented.

In addition, the horizontal G sensor error determination portion 42, may absolutely accomplish the error determination by sufficiently narrowing an allowance range of the error determination threshold, if the first rollover status signal indicating that vehicle rollover and impact do not occur is input from the vehicle impact roll determination module 15B, more particular, if it is determined that vehicle rollover does not occur. The horizontal G sensor error determination portion 42 may not absolutely accomplishes the error determination by sufficiently expanding the allowance range of the error determination threshold value if the first rollover status signal indicating vehicle rollover and impact is input from the vehicle impact roll determination module 15B, more particularly, it is determined that vehicle rollover occurs.

Fourth Embodiment

Figure 4:
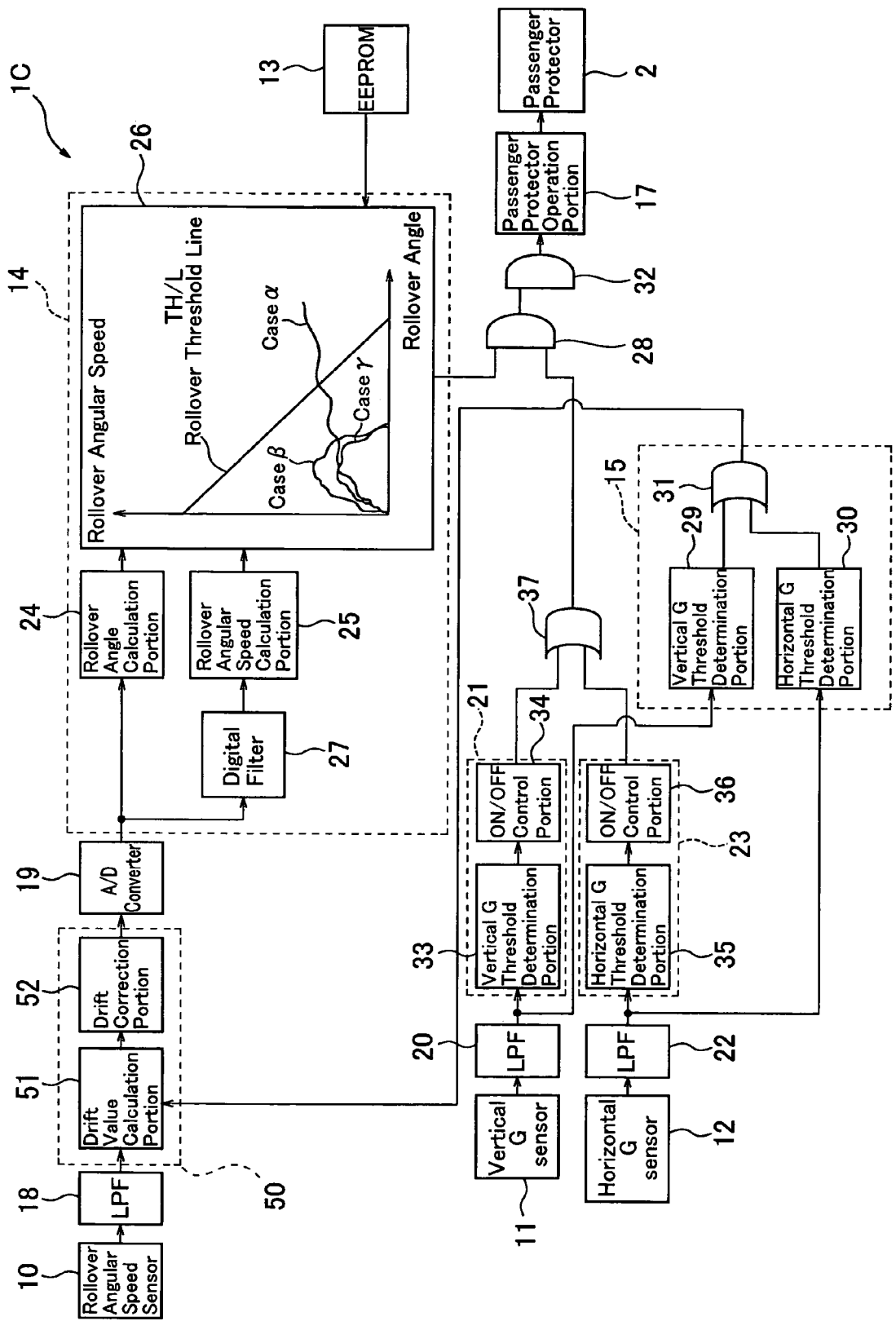
FIG. 4 is a block diagram illustrating an entire passenger protection apparatus of a fourth embodiment of the present invention.

FIG. 4 shows an entire structure of a fourth embodiment of a passenger protection apparatus according to the present invention.

The same reference numbers are used in the portions equivalent of the portions in the first to third embodiments; thus, the detailed explanations will be omitted.

A passenger protection apparatus 1C comprises the rollover angular speed sensor (rollover angular speed detection device) 10, the vertical G sensor 11, the horizontal G sensor 12, the EEOPROM 13, the rollover determination module 14, the vehicle impact roll determination module 15, the passenger protector operation portion (protector control device) 17, and the like, as shown in FIG. 4.

The angular speed signal of the output signal from the rollover angular speed sensor 10 is filtered by the high-frequency noise elimination filter 18, and then is input to the after-mentioned drift correction device 50.

On the other hand, the first rollover status signal to be output from the OR circuit of the vehicle impact roll determination module 15 is also input to the drift correction device 50.

The drift correction device 50 calculates a value of zero-point drift (hereinafter, referred to as a drift value) of an error of an initial setting value observed in the rollover angular speed sensor 10 based on the output signal (detected signal) detected from the vertical G sensor 11 or the horizontal G sensor 12 and the rollover angular speed signal detected by the rollover angular sensor 10, and corrects the rollover angular speed detected by the rollover angular speed sensor 10 with the calculated drift value.

The drift correction device 50 comprises a drift value calculation portion 51 and a drift correction portion 52.

The drift value calculation portion 51 calculates a drift value of the rollover angular speed sensor 10 based on the angular speed signal input from the rollover angular speed sensor 10 and the first rollover status signal input from the vehicle impact roll determination module 15.

The drift value calculation portion 51 calculates the drift value if the first rollover status signal indicating that vehicle rollover and impact do not occur is input and the angular speed signal is within a previously set predetermined value.

The drift value is a value of amount of change that the value of the rollover angular speed detected by the rollover angular speed sensor 10 is changed from zero.

The drift signal of the output signal from the drift value calculation portion 51 is input to the drift correction portion 52 and is stored.

The drift correction portion 52 corrects the rollover angular speed detected by the rollover angular speed sensor 10 by using the drift value calculated by the drift value calculation portion 51, if the angular speed signal input from the rollover angular speed sensor 10 is equal to a previously set predetermined threshold or more, more particularly, the rollover angular speed of the vehicle is largely changed.

In this case, the drift correction portion 52 is, for example, a low-frequency noise elimination filter (HPF: High Pass Filter).

The drift correction portion 52 corrects the rollover angular speed by reducing the drift value to be obtained from a previously calculated and stored drift signal from the rollover angular speed value to be obtained from the angular speed signal detected by the rollover angular speed sensor 10.

Moreover, the angular speed signal that the rollover angular speed is already corrected is converted by the A/D converter 19, and is input to the rollover determination module 14.

Accordingly, the rollover determination module 14 determines the possibility of the vehicle rollover based on the already corrected angular speed signal.

Next, a function of the passenger protection apparatus 1C according to the present invention will be described.

In the passenger protection apparatus 1C, in order to calculate the drift value of the rollover angular speed sensor 10, and to correct the rollover angular speed, at first, the rollover angular speed sensor 10 detects the rollover angular speed of the vehicle, the vertical G sensor 11 detects the acceleration (vertical G) of the up and down direction of the vehicle, and then the horizontal G sensor 12 detects the acceleration (horizontal G) of the right and left direction of the vehicle.

In this case, the vertical G signal detected by the vertical G sensor 11 and the horizontal G sensor detected by the horizontal G sensor 12 are input to the vehicle impact roll determination module 15.

The vehicle impact roll determination module 15 determines whether or not the vehicle rollover occurs based on the input vertical G signal or the horizontal G signal.

In this case, if at least one of the vertical G signal and the horizontal G signal is within the previously set predetermined threshold, the vehicle impact roll determination module 15 determines that the vehicle rollover and the impact to the vehicle do not occur, and outputs the first rollover status signal indicating that vehicle rollover and impact do not occur.

On the other hand, if both of the vertical G signal and the horizontal G signal are beyond the previously set predetermined threshold, the vehicle impact roll determination module 15 determines that the vehicle rollover and the impact to the vehicle occur, and outputs the first rollover status signal indicating vehicle rollover and impact.

If the first rollover status signal indicating that vehicle rollover and impact do not occur is input to the drift correction device 50 from the vehicle impact roll determination module 15, the drift value calculation portion 51 determines whether or not the angular speed signal input from the rollover angular speed sensor 10 is within the predetermined threshold.

If the angular speed signal is within the predetermined threshold, the drift value calculation portion 51 calculates the drift value of the angular speed sensor 10, and outputs the drift signal. The drift signal is input to the drift correction portion 52 and stored.

On the other hand, if the angular speed signal is beyond the predetermined threshold, a correction command signal is output to the drift correction portion 52 from the drift value calculation portion 51, and the drift correction portion 52 corrects the rollover angular speed detected by the rollover angular speed sensor 10.

The drift correction portion 52 corrects the rollover angular speed by reducing the drift value to be obtained from the previously calculated and stored drift signal from the rollover angular speed value to be obtained from the angular speed signal detected by the rollover angular speed sensor 10.

The rollover determination module 14 determines whether or not the vehicle rolls over based on the already corrected angular speed signal output from the drift correction portion 52.

As described above, in the passenger protection apparatus 1C, the drift value of the rollover angular speed sensor 10 can be calculated in a state that the vehicle rollover and the impact to the vehicle do not occur, and the rollover angular speed value can be corrected by using the drift value previously calculated when the rollover angular speed of the vehicle is actually changed in a large way.

In addition, if the angular speed signal to be output from the rollover angular speed sensor 10 is only processed by using the HPF, the zero-point drift can be eliminated when the vehicle rollover does not occur, but the zero-point drift cannot be eliminated when the vehicle rollover actually occurs.

Accordingly, when the vehicle rollover occurs, the rollover angular speed is detected in a state that the zero-point drift is added to the rollover angular speed detected by the rollover angular speed sensor 10. Therefore, the determination performance whether or not vehicle rollover occurs is deteriorated.

On the contrary, in the passenger protection apparatus 1C according to the present invention, the possibility of the vehicle rollover can be determined based on the corrected rollover angular speed. Therefore, the determination accuracy whether or not vehicle rollover occurs can be improved.

Furthermore, in the above passenger protection apparatus 1C, the vehicle impact roll determination module 15 comprises the OR circuit 31, and the vehicle impact roll determination module 15 determines that the vehicle rollover does not occur if the ON signal is input from the vertical G threshold determination portion 29 or the horizontal G threshold determination portion 30. However, this ON circuit 31 can be an AND circuit (not shown).

In this case, if the ON signal is input from both of the vertical G threshold determination portion 29 and the horizontal G threshold determination portion 30, more particular, if the vertical G signal and the horizontal G signal are within the range of the predetermined threshold, the drift value produced in the rollover angular speed sensor 10 is calculated in accordance with the rollover angular signal detected by the rollover angular speed sensor 10.

Accordingly, the accuracy of the drift value produced in the rollover angular speed sensor 10 can be further improved.

It should be noted that although the present invention has been described with respect to specific embodiments, the invention is not limited to these specific embodiments.

What is claimed is:

1. A passenger protection apparatus, comprising:
   a rollover angular speed detection device, which detects a rollover angular speed during vehicle rollover;
   a rollover determination device, which conducts a determination of the vehicle rollover based on the rollover angular speed detected by the rollover angular speed detection device and a rollover angle obtained from the rollover angular speed;
   a passenger protector, which operates in accordance with a determination result of the rollover determination device to protect a passenger;
   a vertical G sensor, which detects an acceleration of an up and down direction of the vehicle;

a horizontal G sensor, which detects an acceleration of a right and left direction of the vehicle; and an angular speed sensor error determination device, which determines whether or not a zero-point drift of the rollover angular speed detection device is observed by comparing a previously set error determination threshold, based on a detected signal of the vertical G sensor or the horizontal G sensor, and said rollover angular speed from the rollover angular speed detection device.

2. A passenger protection apparatus, comprising:

a rollover angular speed detection device, which detects a rollover angular speed during vehicle rollover;

a rollover determination device, which conducts a determination of the vehicle rollover based on the rollover angular speed detected by the rollover angular speed detection device and a rollover angle obtained from the rollover angular speed;

a passenger protector, which operates in accordance with a determination result of the rollover determination device to protect a passenger;

a vertical G sensor, which detects an acceleration of an up and down direction of the vehicle;

a horizontal G sensor, which detects an acceleration of a right and left direction of the vehicle; and an angular speed sensor error determination device, which determines whether or not a zero-point drift of the rollover angular speed detection device is observed by comparing a previously set error determination threshold, based on a detected signal of the vertical G sensor or the horizontal G sensor, and said rollover angular speed from the rollover angular speed detection device.

3. A passenger protection apparatus, comprising:

a rollover angular speed detection device, which detects a rollover angular speed during vehicle rollover;

a rollover determination device, which conducts a determination of the vehicle rollover based on the rollover angular speed detected by the rollover angular speed detection device and a rollover angle obtained from the rollover angular speed;

a passenger protector, which operates in accordance with a determination result of the rollover determination device to protect a passenger;

a vertical G sensor, which detects an acceleration of an up and down direction of the vehicle;

a horizontal G sensor, which detects an acceleration of a right and left direction of the vehicle; and a G sensor error determination device, which determines whether or not a zero-point drift of the vertical G sensor or the horizontal G sensor occurs by comparing a previously set error determination threshold, based on a detected signal of the rollover angular speed detection device, and a vertical G signal input from said vertical G sensor or a horizontal G signal input from said horizontal G sensor.

4. A passenger protection apparatus, comprising:

a rollover angular speed detection device, which detects a rollover angular speed during vehicle rollover;

a rollover determination device, which conducts a determination of the vehicle rollover based on the rollover angular speed detected by the rollover angular speed detection device and a rollover angle obtained from the rollover angular speed;

a passenger protector, which operates in accordance with a determination result of the rollover determination device to protect a passenger;

a vertical G sensor, which detects an acceleration of an up and down direction of the vehicle;

a horizontal G sensor, which detects an acceleration of a right and left direction of the vehicle; and a drift-correction device, which calculates a zero-point drift value of the rollover angular speed detection device based on the detected signal of the vertical G sensor or the horizontal G sensor and a detected signal of the rollover angular speed detection device, and corrects a detected signal of the rollover angular speed detection device by using the zero-point drift value.

5. A passenger protection apparatus, comprising:

a rollover angular speed detection device, which detects a rollover angular speed during vehicle rollover;

a rollover determination device, which conducts a determination of the vehicle rollover based on the rollover angular speed detected by the rollover angular speed detection device and a rollover angle obtained from the rollover angular speed;

a passenger protector, which operates in accordance with a determination result of the rollover determination device to protect a passenger;

a vertical G sensor, which detects an acceleration of an up and down direction of the vehicle;

a horizontal G sensor, which detects an acceleration of a right and left direction of the vehicle; and a drift-correction device, which calculates a zero-point drift value of the rollover angular speed detection device based on detected signals of the vertical G sensor and the horizontal G sensor and a detected signal of the rollover angular speed detection device, and corrects the detected signal of the rollover angular speed detection device by using the zero-point drift value.

* * * * *

UNITED STATES PATENT AND TRADEMARK OFFICE
CERTIFICATE OF CORRECTION

| | |
|---|---|
| PATENT NO. | : 7,761,206 B2 |
| APPLICATION NO. | : 11/384438 |
| DATED | : July 20, 2010 |
| INVENTOR(S) | : Toshikatsu Sawahata |

It is certified that error appears in the above-identified patent and that said Letters Patent is hereby corrected as shown below:

Title page Item (30) Foreign Application Priority Data:

Priority was not claimed for JP 2004-294563, therefore it should be omitted.

Signed and Sealed this
Twenty-second Day of March, 2011

David J. Kappos
*Director of the United States Patent and Trademark Office*